(12) United States Patent
Kassab

(10) Patent No.: US 6,345,661 B2
(45) Date of Patent: Feb. 12, 2002

(54) METHOD OF MAKING DEPRESSED CENTER RAILCARS

(75) Inventor: Gabe M. Kassab, Pittsburgh, PA (US)

(73) Assignee: Kasgro Rail Corp., New Castle, PA (US)

( * ) Notice: Subject to any disclaimer, the term of this patent is extended or adjusted under 35 U.S.C. 154(b) by 0 days.

(21) Appl. No.: 09/827,856

(22) Filed: Apr. 6, 2001

Related U.S. Application Data

(62) Division of application No. 09/235,438, filed on Jan. 22, 1999, now Pat. No. 6,240,853.

(51) Int. Cl.⁷ ............................................. B22D 25/02
(52) U.S. Cl. ........................................ 164/47; 164/76.1
(58) Field of Search .................................. 164/47, 76.1

(56) References Cited

U.S. PATENT DOCUMENTS

| | | | |
|---|---|---|---|
| 4,290,642 A | 9/1981 | Wise | 296/182 |
| 5,564,341 A | 10/1996 | Martin | 105/355 |
| 5,743,192 A | 4/1998 | Saxton et al. | 105/355 |

Primary Examiner—Kuang Y. Lin
(74) Attorney, Agent, or Firm—Buchanan Ingersoll, P.C.

(57) ABSTRACT

A method for producing depressed center railcars involves a combination of casting and fabrication. Transition members of the railcar can be casted, preferably with interlocking ledges on the ends of the transition members. The center section can be fabricated from, preferably precambered, longitudinal stringers which can then be connected between the casted transition members via the interlocking ledges. Standard steel warehouse plates can be attached to the fabricated framework of longitudinal stringers to form the surface of the center section. The transition members can be cast with integral provision to accept a center plate member. The fabricated framework of stringers can include reinforcement members for added strength. The framework can also be constructed to allow for the placement of the parts of the brake system and other components on the underside of the railcar.

4 Claims, 3 Drawing Sheets

METHOD OF MAKING DEPRESSED CENTER RAILCARS

This application is a divisional application of U.S. patent application Ser. No. 09/235,438, filed Jan. 22, 1999, now U.S. Pat. No. 6,240,853 which is hereby incorporated herein by reference.

BACKGROUND

1. Field of the Invention

This invention relates generally to railcars having a depressed center section, and more particularly, to a method of making depressed center railcars.

2. Description of the Prior Art

A depressed center railcar is a particular kind of railway freight vehicle which is typically used to transport oversized and often very heavy objects. A depressed bed railcar is a very much like a flat bed railcar with except the center portion of the bed is lower, i.e. depressed, to the tracks than the ends of the car. Hence, the name "depressed center" railcar. Viewed from the side, each end of the depressed center railcar has an S-shaped portion, commonly called a transition member. The high end of each S-shaped transition member has an extended portion which is typically supported on the railroad tracks by a wheeled assembly called a "truck." The "depressed" center section of the railcar is connected between the lower end of the S-shaped transition members and thus is displaced significantly lower to the tracks than the conventional flat bed railcars. Because such oversize objects are also typically very heavy, the depressed center section is normally provided with some amount of built in positive camber. More simply put, the center section of the railcar is provided with a slight upward, i.e., convex, curvature. This camber is provided for pre-stressing the center section so that when a heavy object is loaded onto the center section, the weight causes the curved center section to "flatten" out somewhat, instead of "bowing" as might otherwise occur. If no positive camber were provided, the heavy load could cause the center section to "sink" in the middle which would create a very undesirable stress concentration in the center section which could very likely result in permanent deformation, and possibly failure, of the center section. Thus, the providing a positive camber in the center section is generally necessary to transport heavy loads.

Train tracks frequently wind their way around fixed objects located in proximity to the rails, both man made, such as wayside equipment, and natural, such as natural formations. Additionally, the rail route often passes through tunnels and under bridges. Consequently, in order to transport oversize freight by rail, some means for lowering the oversize object can be necessary for the object to pass through tunnels and under bridges. The depressed center section of these railcars, provided by the S-shaped transition members, permits the rail transport of oversized objects which could not otherwise be transported over the rails by conventional flat bed railcars.

When depressed center railcars were first produced, the entire railcar was cast in as a single structure. As can be imagined this was a very costly method of production. Consequently, such construction methods have generally been abandoned in favor of more modem types of fabrication. Conventionally, the entire car is fabricated from steel plates and structural members, such as beams. The transitions are typically made using rolled steel which is bent to shape and then welded together. The depressed center bed section is typically fabricated from steel beams and plates which are welded together. The railcar is typically constructed as a single unit. In other words, the depressed center section and the transition ends are normally built and connected together at the same time as the rest of the railcar is being manufactured. As the railcar is being built, the generally desired amount of camber in the depressed center section is provided as the transition ends are being connected. For example, a jig can be used in fabricating the entire railcar such that the jig constrains the center section at a desired amount of camber. However, with the method of construction typically used, the amount of camber in the finished car can be inconsistent from car to car. Typically, the some amount of desired camber is provided during fabrication of the railcar. Then, to obtain the precise amount of camber desired, the railcar is typically heated and recambered after fabrication is complete. However, the heating and bending required for recambering can have undesirable effects on the newly fabricated railcar.

The original method of casting the entire railcar is prohibitively expensive. Additionally, the conventional method of fabricating the entire railcar, though more cost effective than casting, also has significant disadvantages. As described above, conventional fabrication methods typically fail to provide the precise amount of desired camber in the finished railcar, and thus require recambering after initial fabrication is completed.

Clearly, cambering the railcar is the source of much difficulty and expense in terms of getting it right and doing it efficiently and consistently. Obviously, it would be much easier to simply build a depressed center railcar having a flat center section. However, as explained previously, some amount of positive camber is typically necessary.

Therefore, there is a need for a method of making depressed center railcars which overcomes the disadvantages of known methods of construction and which provides for consistently and accurately building-in the desired amount of camber without the need for post construction recambering processes. Additionally, such a method should also increase the efficiency of producing precambered depressed center railcars by providing for the use of standardized components.

SUMMARY

A method according to the invention for construction depressed center railcars involves a combination of casting and fabrication. The transition ends for the railcar can be casted, preferably with integral interlocking ledges which can be used as connection members for the cambered center section. A fabricated framework of longitudinal stringers can be connected between the cast transition ends using the interlocking ledges. The longitudinal stringers are preferably provided with approximately the desired amount of camber already built into each stringer before they are connected between the transition ends. Reinforcing members can be connected to the framework of longitudinal stringers for added strength. Standard steel warehouse plates can be welded to the surface of the longitudinal stringers to complete the fabricated center section. Depressed center railcars can thus be efficiently constructed using the method of the invention wherein standardized components can be used. The transition ends can also be casted with provision for a center plate. The longitudinal stringers can be provided in standard sizes with any amount of desired camber already built-in. The interlocking ledges of the transition ends allow the longitudinal stringers to be easily joined to standard sized cast transition ends. Consequently, depressed bed railcars can be constructed according to the method of the invention using a combination of casted and fabricated parts. In this manner, depressed bed railcars can be produced wherein a high degree of consistency in quality and precision, particularly with respect to the amount of built in camber is maintained. As a result, no post construction heating and bending is required to achieve the desired camber in the center section.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION OF CERTAIN EMBODIMENTS

Figure 1:
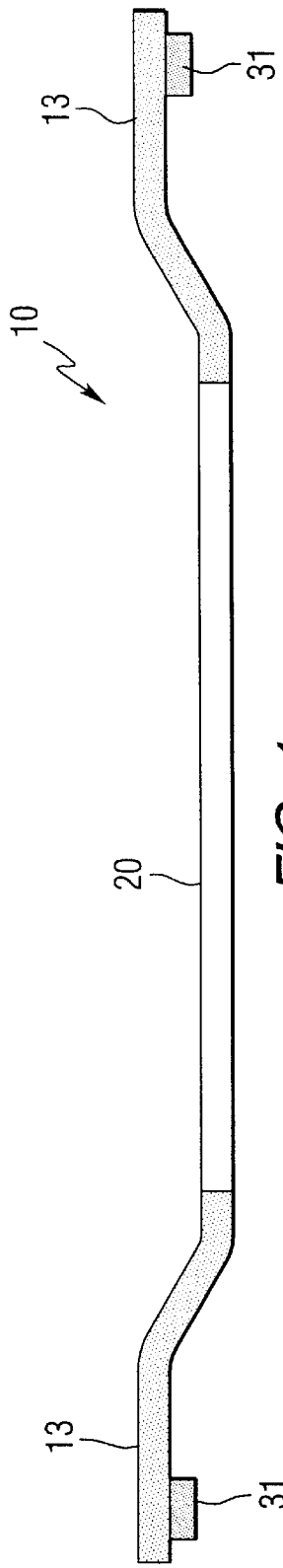
FIG. 1 is a side view of an embodiment of a depressed center railcar constructed according to the method of the invention.
Figure 2:
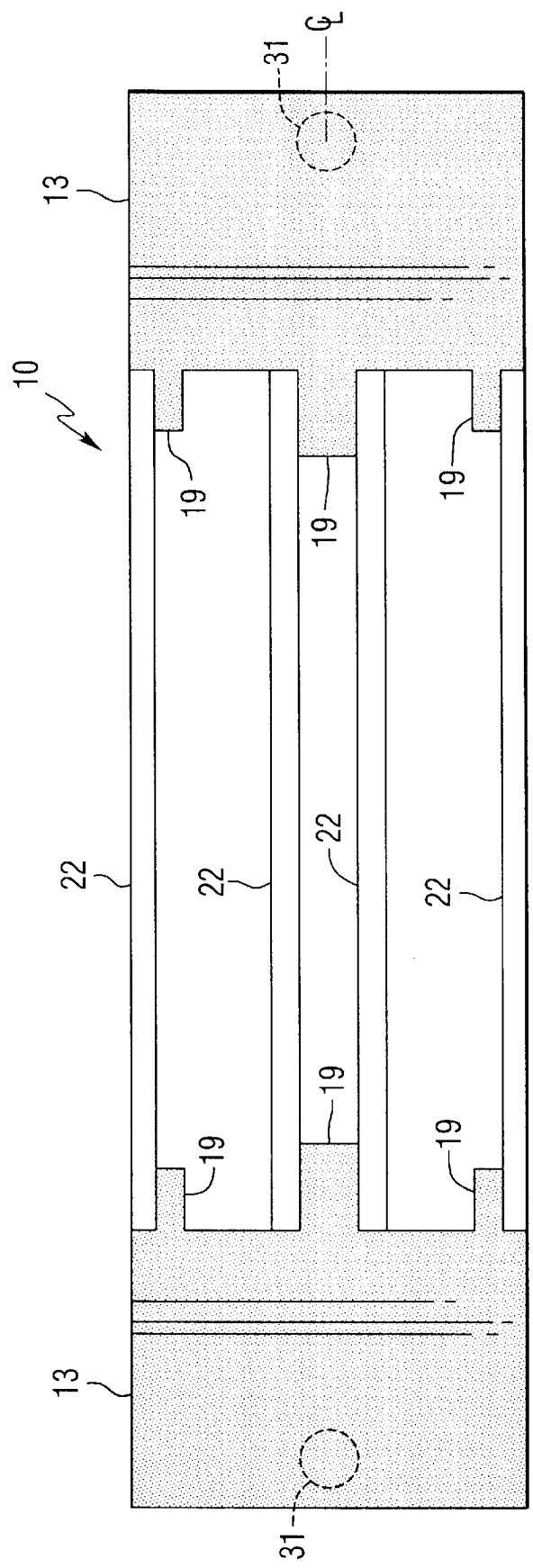
FIG. 2 is a top plan view of an embodiment of the railcar shown in FIG. 1 showing the longitudinal stringers connect between the transition members.

Referring now to the drawing figures wherein like reference numbers refer to similar parts throughout the several views, an embodiment of a depressed center railcar constructed using a method according to the invention is shown in FIGS. 1–2. The railcar 10 has an S-shaped transition member 13 at either end of the railcar 10 which provides for the depressed central portion. The center section 20 is connected between the transition members 13 and forms the depressed bed portion of the railcar 10.

According to the method of the invention, the S-shaped transition members are cast components and the center section 20 is a fabricated framework of longitudinal stringers 22. Preferably, the longitudinal stringers 22 are provided with a desired amount of built-in camber and the transition members 13 are provided with interlocking members (ledges) 19. These interlocking ledges 19 facilitate the connection of the ends of the longitudinal stringers 22 to the transition members 13. Each of the longitudinal stringers 22 can be connected between the transition members 13 preferably by welding the ends 23 of the stringers 22 to the interlocking ledges 19.

Figure 3:
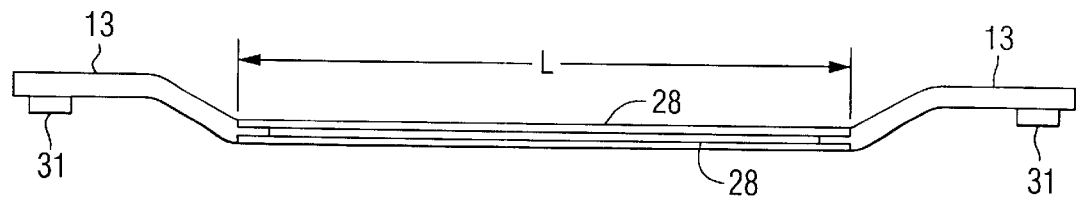
FIG. 3 is a side sectional view taken along the line III—III in FIG. 2.
Figure 4:
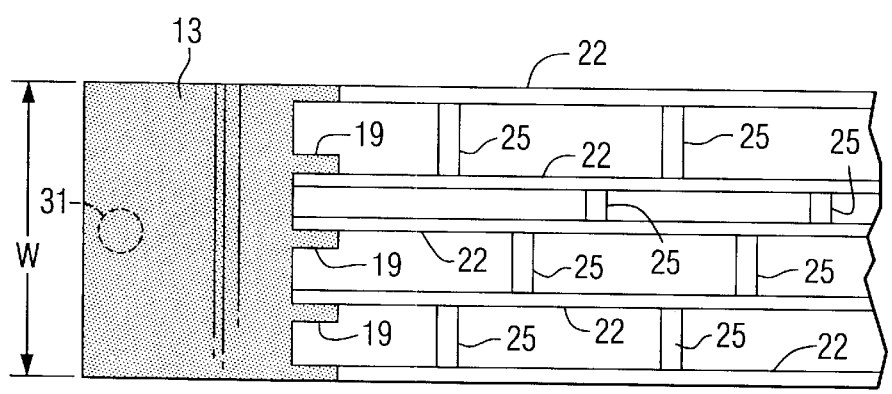
FIG. 4 is a top plan view similar to the railcar shown in FIG. 3 but additionally showing reinforcement members connected between the longitudinal stringers.

Further details of the railcar construction are illustrated in FIGS. 3 and 4. As shown, the fabricated framework of longitudinal stringers 22 can also include multiple reinforcement members 25 which increase the strength and rigidity of the depressed center section 20. Additionally, the surface of the center section can be fabricated from steel plates 28 which are preferably welded to the framework of longitudinal stringers 22 and reinforcement members 25. The steel plates 28 can also be welded to the underside of the center section 20 if desired. The length "L" and width "W" of the of the center section as shown in FIGS. 3 and 4, of the railcar 10 can be, for example, about 24 or 25 feet and about 10 feet, respectively.

According to the method of the invention, each longitudinal stringer 22 can be provided with a desired amount of built-in camber before the stringers 22 are ever connected between the S-shaped transition members 13. Therefore, when the longitudinal stringers 22 and reinforcement members are fabricated into the framework of the center section between the transition members 13, the center section 20 will already have a built-in amount of camber. Precambering the center section 20 in this manner helps to provide a high level of accuracy and consistency in the cambering of the depressed center railcars.

Figure 5:
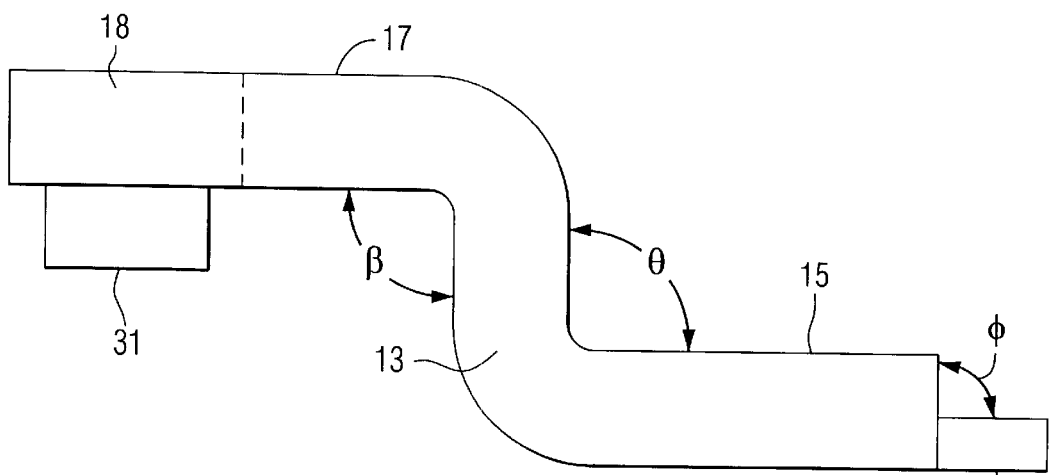
FIG. 5 is a side view of a cast transition member.

Referring now to FIG. 5, the interlocking ledges 19 can be a separate component which is attached to the lower leg 15 of the S-shaped transition members 13. Preferably, however, the interlocking ledges 19 are integrally cast with the lower leg portion 15. The interlocking ledges 19 are provided on the lower leg 15 to allow for the center section 20 to be lower to the rails, thus forming the "depressed" center section of the railcar 10. Additionally, a provision 31 for a center plate arrangement to be connected to a freight type railway truck can be provided on an extended portion 18 of the upper leg 17 of the S-shaped transition member 13. This extended portion 18 can be a separate member which is attached to the upper leg 17 or can be cast as an integral portion of the upper leg 17. Similarly, the provision 31 can be a separate component from the extended portion 18 or can be integrally cast therewith.

The camber of the center section 20 is preferably built substantially entirely into the longitudinal stringers, as will be described more fully below. Consequently, the S-shaped transition member 13 preferably does not, in itself, provide for any built in camber. Specifically, the angles represented by the symbols β and θ, between the vertical portion of the transition member 13 and each of the lower 15 and upper 17 legs, respectively, are preferably each about 90 degrees. Additionally, the angle represented by the symbol φ, between the interlocking ledge and the end of the lower leg 15, can also preferably be about 90 degrees. However, it is to be understood that the transition member 13 could alternatively be formed such that the aforementioned angles did vary sufficiently from 90 degrees and could therefore provide a certain amount of camber built into the transition member 13, if desired.

Figure 6:
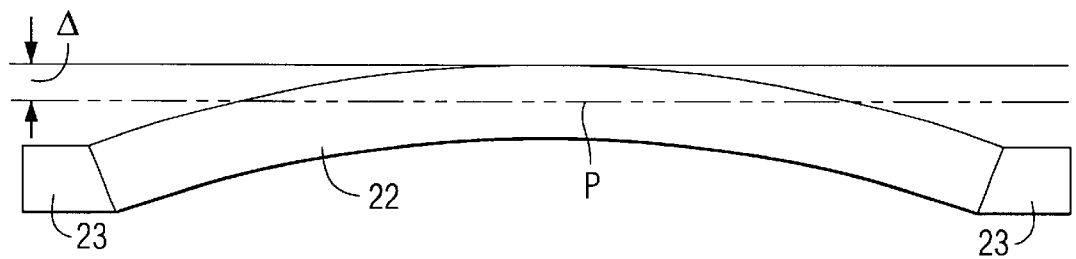
FIG. 6 illustrates a method of precambering longitudinal stringers.
Figure 7:
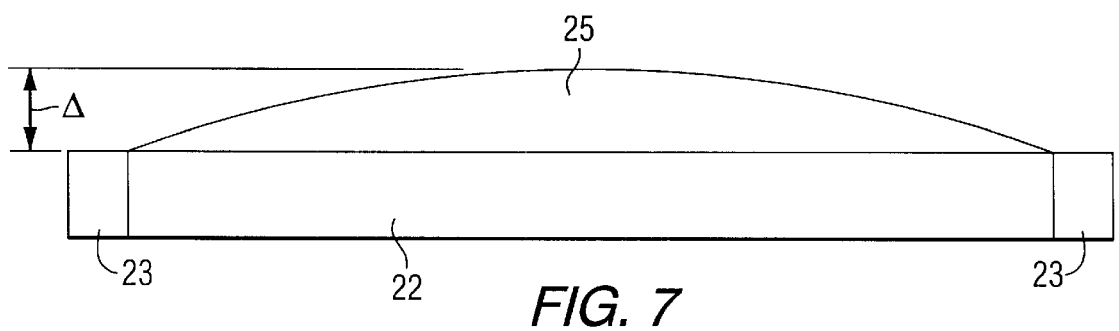
FIG. 7 illustrates another method of precambering longitudinal stringers.
Figure 8:
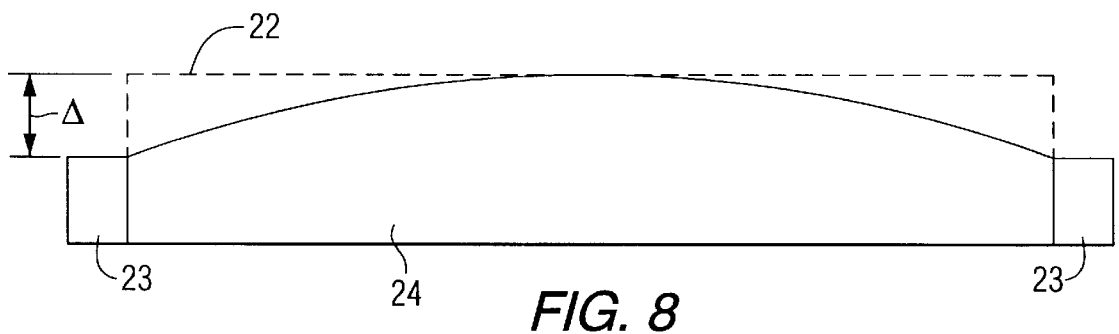
FIG. 8 illustrates a further method of precambering longitudinal stringers.

The camber is indicated by the symbol "Δ," in FIGS. 6–8, wherein different methods of providing the built-in camber in the longitudinal stringers 22 is illustrated. The camber, in inches, is the difference, Δ, between the midpoint of the stringer 22 and a plane represented by the line labeled "P." The amount of camber built into the stringer 22 is considered "positive" since Δ of the stringer 22 is above the line P. If the middle of the stringer 22 was curved in the opposite direction, i.e., downward, the camber would be referred to as "negative." Some amount of positive camber is usually desirable. Typically, for a 24 or 25 foot center section, a Δ of about three quarters of an inch to one inch positive camber is provided. Positive camber, as opposed to negative camber, is desirable because, generally, when the typically heavy loads carried by these railcars are loaded onto the center section 20, the load tends to deflect the center section 20 downwards. Positive camber is provided so that when the load deflects the center section 20 downwards, the end result is that the center section 20 is mostly parallel to the plane P. Without positive camber, the load on the center section 20 might cause the center section 20 to bow downwards thus creating a negative camber. Negative camber can typically be highly undesirable since it can result in the permanent deformation, or possible failure, of the center section 20.

One method in providing built in camber in the longitudinal stringers 22 is to simply bend the stringer 22 as shown in FIG. 6. The flat surfaces can be machined into the ends 23 of the stringer 22 to mate evenly with the interlocking ledges 19 on the S-Shaped transition members 13. Alternatively, the ends 23 can be a separate piece which is attached to the stringers 22.

Another method of precambering the stringers 22 is shown in FIG. 7. According to this method, an arc-shaped cap 25 can be provided which is attached to the top side of the stringer 22. As with the stringer shown in FIG. 6, the flat surfaces can be machined into the ends 23 of the stringer 22 or the ends 23 can be separate components. The thicker center portion of the cap 25 strengthens the middle of the stringer 22 such that it will resist bowing when a heavy load is carried on the center section 20.

A third method of creating a precambered stringer 24 involves machining an arc into the top side of a rectangular stringer 24. As shown, the upper corners of the stringer 24, shown in dashed lines, can be machined down and tapered towards the center of the stringer 24 to produce an arc shaped top side. Preferably, the stringer 24 from which the corners are machined to provide the thicker midsection is taller than the stringer 22 such that the height of the stringer 24 after machining will be about the same as the stringer 22 on which the cap 25 is affixed. However, the height of the stringers 22 can vary depending on the desired strength of the center section 20, which can depend on the particular amount of weight which the railcar will be expected to carry. Thus, smaller stringers 22 can be used where lighter loads are to be transported on the center section 20. Also, as with the two preceding methods of precambering shown in FIGS. 6 and 7, flat surfaces can be machined into the ends 23 of the stringer 24, or the ends 23 can be separate components, for connecting the stringer 24 to the interlocking ledges 19 on the transition members 13.

In any of the previously described precambering methods, the amount of camber, Δ, may be from about three quarters of one inch to about one inch for a center section 20 having a length of about 24 or 25 feet.

A method according to the invention utilizing a combination of cast and fabricated parts for producing the previously described depressed center railcar can generally have the steps described below. First, the S-shaped transition members 13 are separately cast using standard size molds. The cast transition members 13 can preferably include integrally cast interlocking ledges 19 for attachment of the longitudinal stringers 22. The longitudinal stringers 22 can preferably be preformed with a certain amount of camber. If desired, such stringers 22 can be pre-bent in different, commonly used degrees of camber. A number of such standard precambered stringers 22 can be kept in stock so that center sections 16 can be conveniently produced in different degrees of camber without having to initially bend each stringer 19 before beginning construction. Each end of the precambered stringers 22 is then connected to an interlocking ledge 19 of the pair of transition members 13 at either end of the railcar 10. Preferably, the stringers 22 are welded to the interlocking ledges 19. Once the stringers 22 are connected between the two transition members 13 to form the framework of the center section 20, reinforcement members 25 can be connected between the stringers 22 for increased strength and rigidity. Finally, the top surface of the center section 20 can be completed by attaching, typically by welding, standard sized steel warehouse plates 28 to the fabricated framework of longitudinal stringers 22 and reinforcement members 25. The use of the fabricated framework of stringers 22 allows standard sized steel warehouse plates to be welded directly to the framework without having to splice them together as is typically done in some conventional methods of fabricating such railcars. If desired, the standard steel plates 28 can also be provided on all or a portion of the underside of the center section 20.

Since railcars of this type normally require a center plate attachment, the transition members 13 can cast with a provision 31 for a center plate interface. Preferably, the interface provision for the center plate can be integrally cast with the transition end to minimize post-casting modifications. Additionally, the framework of longitudinal stringers 22 and reinforcement members 25 can be fabricated to allow for the placement and attachment of brake system hardware and other required components on the underside of the center section 20.

Thus, to construct a depressed center railcar using a combination of cast and fabricated components according to the invention, only a relatively few simple stages are required wherein a combination of standardized cast and fabricated components can be relatively quickly connected together to construct a depressed center railcar 10. Furthermore, this method advantageously utilizes the best features of two different types of construction methods to provide for the more efficient production of depressed center railcars 10. Consequently, depressed center railcars can be produced with a high degree of accuracy and consistency in the desired amount of camber in the center section 20 without requiring post construction heating and recambering procedures. Additionally, standardized parts can be developed for improved efficiency and cost effectiveness.

Although the interlocking ledges 19 facilitate the connection of the precambered longitudinal stringers 22, it is to be understood that the ends of the stringers 22 could be otherwise attached in various other ways within the knowledge of one skilled in the art and the provision of interlocking ledges 19 is not necessary to the method according to the invention.

Furthermore, while certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention which should be awarded the full breadth of the following claims and any and all embodiments thereof.

What is claimed is:

1. A method of making a depressed center railcar comprising making a transition member for connecting to either end of a precambered center section, said method comprising:

a. casting said transition member in an S-shape; and
   b. providing at least one interlocking ledge on at least one end of said S-shaped transition member for connecting an end of said precambered center section.

2. The method of claim 1 further comprising providing an interface on an opposite end of said cast S-shaped transition member for attaching a center plate arrangement.

3. The method of claim 1 wherein said at least one interlocking ledge is an integrally cast portion of said cast S-shaped transition member.

4. The method of claim 3 wherein said interface is an integrally cast portion of said S-shaped transition member.

* * * * *